United States Patent [19]

Ahmady

[11] Patent Number: 4,900,245
[45] Date of Patent: Feb. 13, 1990

[54] INFRARED HEATER FOR FLUID IMMERSION APPARATUS

[75] Inventor: Farshid Ahmady, Rochester, Mich.

[73] Assignee: Solaronics, Rochester, Mich.

[21] Appl. No.: 262,516

[22] Filed: Oct. 25, 1988

[51] Int. Cl.$^4$ ............................................. F23D 14/12
[52] U.S. Cl. ...................................... 431/328; 431/74
[58] Field of Search ........................... 431/328, 329, 74

[56] References Cited

U.S. PATENT DOCUMENTS

| 3,208,247 | 9/1965 | Weil et al. | 431/328 |
| 3,425,675 | 2/1969 | Twine | 431/328 |
| 4,568,595 | 2/1986 | Morris | 264/59 |
| 4,604,054 | 8/1986 | Smith | 431/328 |
| 4,608,012 | 8/1986 | Cooper | 431/328 |

Primary Examiner—Carroll B. Dority
Attorney, Agent, or Firm—Lynn E. Cargill

[57] ABSTRACT

An infrared heater for fluid immersion apparatus is disclosed and includes a cylindrical ceramic foam radiant gas burner, the burner being made from retriculated ceramic foam having a porosity of about 40 to about 100 pores per linear inch. Also disclosed is a high emissivity coating on the reticulated ceramic foam burner element for substantially decreasing the likelihood of backflashing. In conjunction with the burner element, a cylindrical baffle having unevenly spaced openings distributes the gas mixtures within the burner element to enhance uniform burning.

18 Claims, 2 Drawing Sheets

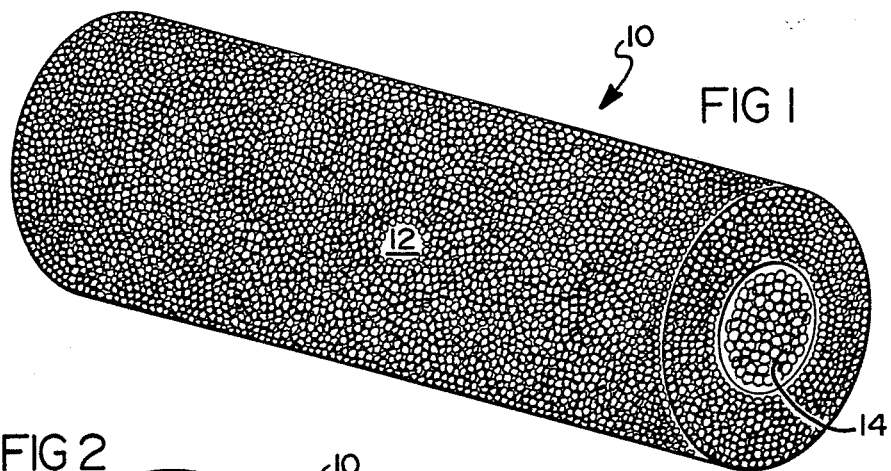
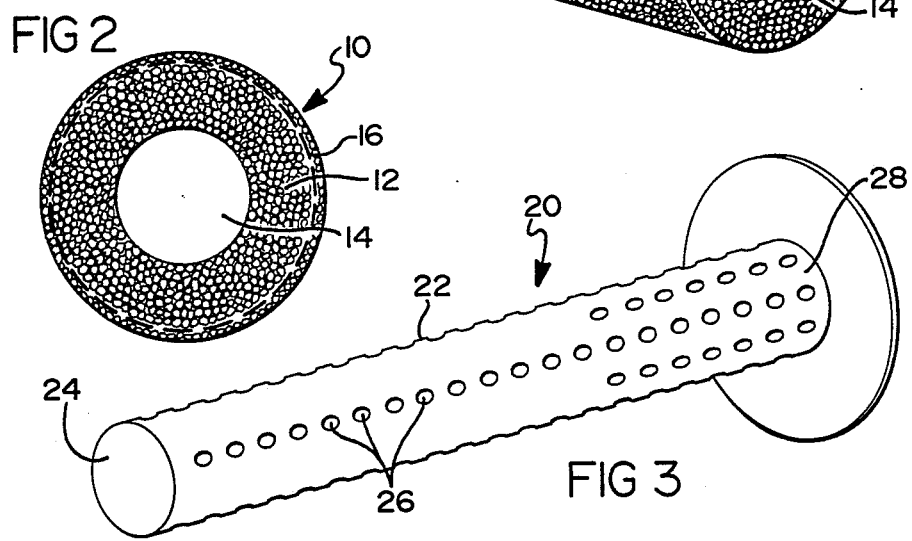
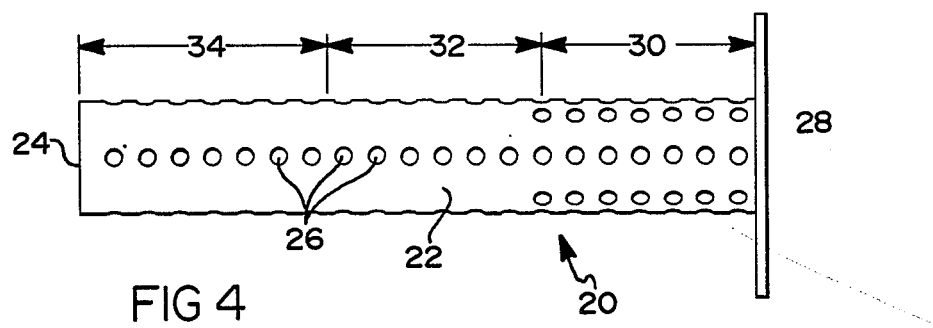

INFRARED HEATER FOR FLUID IMMERSION APPARATUS

TECHNICAL FIELD

This invention relates to gas burners, and more particularly to gas burners having a cylindrical radiant burner element made of reticulated ceramic foam.

BACKGROUND OF THE INVENTION

Burner elements have long been used to heat fluids in commercial, industrial and residential applications. In the past, flat plenum clay tiles were used to pass gas mixtures for burning on the surface of the element. These heaters are undesirable because they lose heat to the environment and they heat undesirable sections of the system. Cylindrical heaters have been found to be more efficient, but they require a fine balance of pressurized gases and uniformity so that the flame does not creep back into the mixing chamber and explode or backflash.

In selecting a material to be used for distributing gas in a burner element, the following criteria have been found to be important:

1. The material should allow for a low pressure drop.
2. The material must have uniform openings for evenly distributing the gas mixture.
3. The material should have good insulative properties to prevent backflashing. If heat from the flame creeps back into the inner portion of the element, the gas ignites inside the element and backflashes.
4. When using propane gas, a material is needed which ignites strictly on the outer surface. All gases should ignite on the surface, however since propane has a higher flame velocity than natural gas (2.85 ft/sec to 1 ft/sec) its flame has a higher tendency to creep into the pore. In other words, it burns closer to the surface than a natural gas flame.

The general problems experienced by prior art devices included non-uniform pore sizes, problems with high back pressures and backflashing when flames crept back to the source of the combustion gas. Recently, ceramic fibers have been used to make the cylindrical burner elements, but these fibrous elements lack integrity. Ceramic fiber burner elements are made by placing wet ceramic fiber over a predetermined size mesh, and vacuuming the moisture out to form a cylinder of fibers. Because the fiber matrix must be thin enough to allow gas to pass therethrough, the strength of the matrix is compromised and the material subsequently degrades. Furthermore, the filter-like structures clog with dust and impurities carried by the gas, and the filters require higher pressures to force the gas therethrough.

In the very recent past, ceramic foam elements have been used for constructing burners. Ceramic foam is made by soaking a polyurethane foam or other combustible foam material with a liquid ceramic material, drying it and burning off the foam material to leave a porous ceramic structure. By selecting the proper pore size of the precursor foam, the number of pores per linear inch may be predetermined for desired results. These ceramic foam materials were developed for filtering high temperature casting alloys. The following patents are illustrative of previous attempts to remedy the above-mentioned patents.

Cooper U.S. Pat. No. 4,608,012 issued Aug. 26, 1986 discloses a gas burner made of cylindrical reticulated ceramic foam with porosities in the range of 15-40 pores per linear inch. In that disclosure, it was stated that ceramic foam materials having a porosity of 45 pores per linear 25 mm (about one inch) would not pass a sufficient quantity of gas/air mixture to provide stable combustion because the pore size was too small and excessive back pressure was created in the mixing chamber, thereby preventing sufficient air from being induced to provide the correct ratios of gas/air mixtures. It was furthermore disclosed that the best results had been obtained with a porosity of about 30 pores per linear 25 mm.

Weiss U.S. Pat. No. 3,191,659 issued June 29, 1965 discloses a catalyst or thermocatalytically active material applied to a fibrous support to form a coherent layer or body of relatively large thermocatalytically active surface dimension transmissive to fuel vapors. In FIG. 5, tube 13 introduces a more or less uniformly diffused stream of air-gas mixture into the element by virtue of the perforations 14.

Craig U.S. Pat. No. 4,400,152 issued Aug. 23, 1983 to Craig, et al., discloses a porous ceramic heating reactor positioned within a tubular casing to contain a flame and the end products of combustion. The size and shape of the tubular casing were designed to provide an explosion proof, leak proof, efficient heat transfer device.

Craig et al. U.S. Pat. No. 4,416,619 issued Nov. 22, 1983 discloses a porous ceramic reactor used in a heating system. The outer surface of the ceramic reactor has a plurality of indentations which breaks up the surface continuity. The indentations were designed to minimize the scaling and cracking that occurs due to differential expansion and contraction. It was stated that if the surface of the reactor could be broken up in a thermal sense into individual areas or parcels, the limited surface area of each parcel would not expand or contract enough to cause a crack. If a crack did develop, its extent would have been limited by the boundary of the individual parcel.

Morris U.S. Pat. No. 4,568,595 issued Feb. 4, 1986 discloses a ceramic structure for filtering hot fluids such as diesel exhaust or liquid metals comprising a reticulated ceramic portion defined by a plurality of interconnecting webs having a pore distribution of between 5-125 pores per linear inch and a ceramic coating portion sintered to the webs along a surface defined by one face of the coating. The coating has a thickness less than about 3 mm with a ratio of average thickness of the coating to the thickness of the web forming the reticulated ceramic foam between 1-10. The coating is sintered to the flame and is matched to minimize thermal shock.

Accordingly, it is the primary aim of the present invention to provide a highly efficient cylindrical radiant heat burner for a fluid immersion apparatus which will uniformly burn combustion gases without backflashing. The present invention is designed to provide enhanced uniform heating, while reducing fuel consumption and reducing manufacturing costs due to the one-piece construction.

SUMMARY OF THE INVENTION

In accordance with the present invention, there is provided a cylindrical ceramic foam radiant gas burner including a gas combustion burner element made of a reticulated ceramic foam having a porosity of from about 40 to about 100 pores per linear inch. Preferably, the radiant gas burner element has a density of from about 0.36 to about 0.5 grams per cubic centimeter, and has a percentage linear expansion of less than 0.36% at about 1600° Fahrenheit. A high emissivity composition coating may be included to substantially decrease the likelihood of backflashing. The coating may include a graphite-containing composition. The reticulated ceramic foam element may be made of a lithium aluminum silicate composition.

Further in accordance with the present invention, a ceramic foam radiant gas burner is disclosed which also includes a cylindrical baffle, an ignition apparatus, and an ionization detector in electrical communication with a feedback circuit to provide information on the status of the combustion flame. The cylindrical baffle is located within the reticulated ceramic burner element and has receiving terminal ends with openings therein for unevenly distributing gas mixtures within the burner element itself.

The ignition apparatus may include at least two electrodes, each being sufficiently long to ignite gas as close to the terminal end of the burner as possible, while being sufficiently short to minimize occurrences of undesired sparking from any point other than the terminal end.

The ionization detector may include a detector portion bent to extend into the blue portion of the combustion flame for receiving reliable information. Because the greatest concentration of ions are present in the blue portion of the flame, the ionization detector is most efficient when located therein. The feedback circuit is in electrical communication with the ionization detector and provides information to the ignition apparatus to re-spark the flame in the event that the ionization detector relays information that the combustion flame has extinguished.

The reticulated ceramic foam disclosed herein may comprise an open-cell structure ceramic foam such as Reticel, a trademark for Hi-Tech Ceramics, Inc. of Alfred, N.Y. Such a reticulated ceramic foam has a lithium-aluminum-silicate composition and is able to withstand thermal shock, temperature stressing and compression strengths.

BRIEF DESCRIPTION OF THE DRAWINGS

Further features and other objects and advantages of this invention will become clear from the following detailed description made with reference to the drawings in which:

FIG. 1 is a perspective view of a cylindrical reticulated ceramic foam gas combustion burner made in accordance with the present invention;

FIG. 2 is an end view of the reticulated ceramic foam element of FIG. 1;

FIG. 3 is a perspective view of a cylindrical baffle to be located within the reticulated ceramic foam burner element of FIG. 1;

FIG. 4 is a side view of the cylindrical baffle of FIG. 3 illustrating the positioning of the distribution openings and three integral portions;

Figure 5:
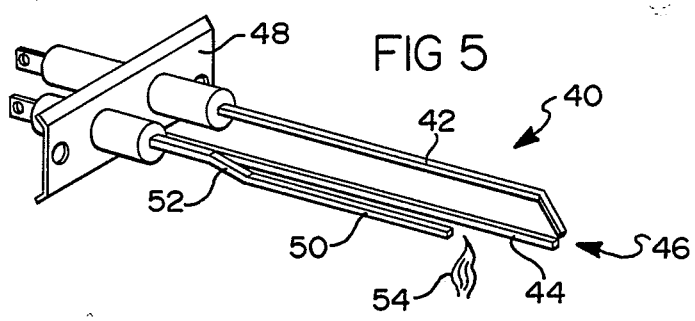
FIG. 5 is a perspective view of an ignition apparatus and an ionization detector assembly.

While the invention will be described in connection with a preferred embodiment, it should be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, a cylindrical ceramic foam burner element is generally denoted by the numeral 10. Burner element 10 is composed of a reticulated ceramic foam material 12 made by soaking a reticulated combustible foam material with a liquid ceramic material. The foam material is dried and then fired to burn out the combustible foam material, leaving a porous ceramic article. Preferably, the cylinder as shown in FIG. 1 has an open end 14 for receiving the other components described hereinafter of a radiant gas burner. Because the ceramic foam material exhibits a low hydraulic resistance to gas and air flow, the thickness of reticulated ceramic foam 12 may depend upon structural criteria rather than performance criteria. Reticulated ceramic foam 12 is preferably made of a material having a density of from about 0.36 to about 0.5 grams per cubic centimeter, including materials such as lithium alumina silicate, but may also be formed of many other materials, such as mullite, alumina or zirconium oxide. The linear expansion of lithium alumina silicate is far superior than the other listed materials. The percentage linear thermal expansion is less than about 0.36% at about 1600° Fahrenheit for the lithium alumina silicate, and thus is desirable for the application of a radiant gas burner. The porosity of reticulated ceramic foam 12 may be from about 40 pores per linear inch to about 100 pores per linear inch, although the preferred range is from about 40 to about 65 pores per linear inch, and specifically about 45 pores per linear inch. In other words, from 40 to 100 ppi. The standard unit, ppi, means the number of per pores per linear inch. That is, the number of pores that fall on a straight line one inch long.

In looking now to FIG. 2, the end view of the cylindrical gas burner element is illustrated showing reticulated ceramic foam material 12 having an open end 14. A coating 16 is shown on the external surface of the ceramic foam material 12, and may be comprised of a high emissivity composition to substantially decrease the likelihood of backflashing during the operation of combustion. While others have attempted to use thermocatalytic coatings, it has been found that high emissivity composition coatings reradiate more heat, increase production, reduce fuel consumption, and provide more uniform heating. A black body material coating, such as a graphite-containing coating has been found to give high emissivity. Such a graphite coating is available from the Holden Company of Milford, Mich., originally sold for use on insulating refractor linings. Besides maintaining the integrity of the ceramic foam burner element, combustion flames occur more evenly across the coated surface of the element and more uniform heating is achieved. The graphite coating is most advantageous when it is externally applied to a reticulated ceramic foam element made of lithium, aluminum and silicon-containing composition having a porosity of from about 40 to about 100 pores per linear inch, more particularly 40–65 pores per linear inch, and especially 45 pores per linear inch. It is also preferable for the reticulated ceramic foam to have a percentage linear expansion of less than 0.36% at about 1600 degrees Fahrenheit and a density of from about 0.36 to about 0.5 grams per cubic centimeter.

Figure 6:
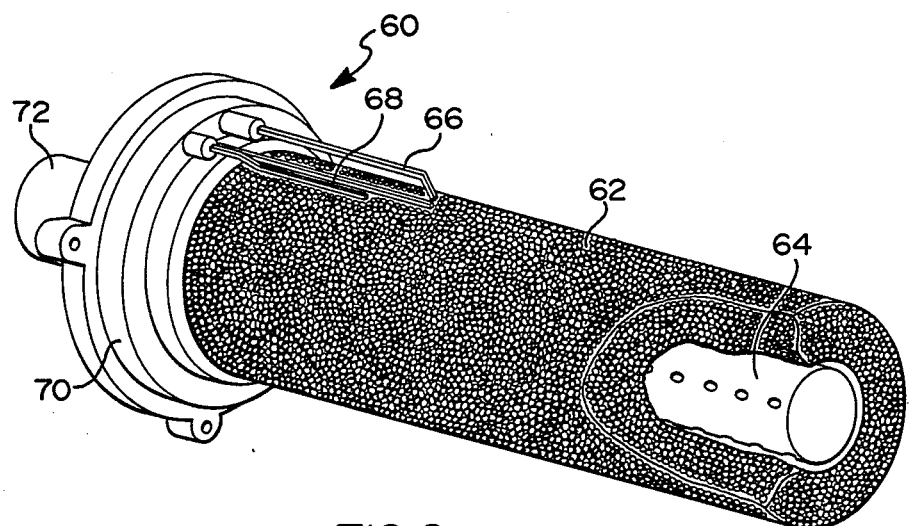
FIG. 6 is a perspective view of a ceramic foam radiant gas burner with all of its components as constructed in accordance with the present invention.

The construction of a cylindrical diffuser baffle according to the invention will be explained by reference to FIG. 3. The diffuser baffle of the present invention is generally denoted by numeral 20 and includes a cylindrical metallic baffle 22 having a terminal end 24. Although terminal end 24 is closed, openings 26 are disproportionately spaced over the entirety of the baffle to evenly distribute the gas for enhanced burning. Cylindrical baffle 22 has a substantially round cross-section and is shaped so that it may be inserted within the reticulated ceramic foam burner element. Baffle 22 also has a gas receiving end 28 which is located near the end plate as shown in FIG. 6 during operation.

With combined reference to FIGS. 3 and 4, relative placements of the openings 26 may be seen. Cylindrical baffle 20 may be made of three integral and even portions, the first portion 30 acting as the receiving end, including at least twice as many openings as the other two portions. Second and third portions 32 and 34, respectively, act as a conduit and a terminal end. Each of the second and third portions have substantially equal numbers of openings therein.

Looking now to FIG. 5, the ignition apparatus and ionization detector are shown in combination and are generally denoted by numeral 40. First and second electrodes 42 and 44, respectively, of the ignition apparatus are shown having terminal ends at 46. First and second electrodes 42 and 44 are of a sufficient length to ignite gas as close to the terminal end of the burner as possible, yet short enough to minimize occurrences of undesired sparking from any point other than the terminal end. As will be further described hereinafter with reference to FIG. 6, if electrodes 42 and 44 are too long, arcing occurs between the bodies of electrodes 42 and 44 and undesirable sparking occurs at places other than the electrode tips. End plate 48 acts to receive the electrodes 42 and 44 and secure them in place adjacent to the burner element. Furthermore, ionization detector 50 is also attached to end plate 48, and has a bent portion 52 extending the detector part of the ionization detector into the blue portion 54 of a combustion flame. As in any flame, the blue, or outer, portion of the flame contains the greatest concentration of ions. Therefore, it is advantageous to place the detector portion within the blue flame so that the most reliable information about the combustion flame may be gathered.

The construction of a radiant gas burner according to the present invention will be explained by reference to FIG. 6, in which the radiant gas burner is generally denoted by numeral 60. Radiant gas burner 60 includes a burner element 62, a diffuser baffle 64, an ignition apparatus 66 and an ionization detector 68, all attached to an end plate 70. A feedback circuit, not shown, is in electrical communication with the ionization detector. The relative placement of all of these components is illustrated in FIG. 6, although many different arrangements for the components may be advantageous for different applications. The preferred embodiment as illustrated in FIG. 6 is especially useful in fluid immersion apparatus, such as oil fryers, hot fluid heaters and other infrared burner applications.

In its operation, the radiant gas burner 60 is generally inserted within a metallic casing, and submerged into fluid to be heated. In general, the combustion gas is introduced into chamber 72 which is connected to cylindrical diffuser baffle 64. As the gas travels into the inner chamber within the burner element 62 through diffuser baffle 64, a spark is initiated by ignition apparatus 66 lighting the gas as it emerges to the surface of burner element 62. Due to the design of the reticulated ceramic foam having a porosity from about 40 to about 100 pores per linear inch, the gas is evenly distributed across the surface and therefore burns evenly. If the combustion flame goes out, ionization detector 68 reads information into the feedback circuit which is in electrical communication with ignition apparatus 66, and the ignition apparatus re-sparks the flame to maintain the heating by the radiant gas burner 60.

Thus it is apparent that there has been provided, in accordance with the invention, a radiant gas burner that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A ceramic foam radiant gas burner, comprising a cylindrical gas combustion burner including a burner element made from a reticulated ceramic foam having a porosity of about 40 to about 100 pores per linear inch with a density of from about 0.36 to about 0.5 grams per cubic centimeter and being coated with a composition to substantially decrease the likelihood of back flashing.

2. The radiant gas burner of claim 1, wherein said porosity of the reticulated ceramic foam element is from about 40 to about 65 pores per linear inch.

3. The radiant gas burner of claim 1, wherein said porosity of the reticulated ceramic foam element is about 45 pores per linear inch.

4. The radiant gas burner of claim 1, wherein said reticulated ceramic foam is made of a lithium, aluminum and silicon-containing composition.

5. The radiant gas burner of claim 1, wherein said reticulated ceramic foam has a percentage linear expansion less than 0.36% at about 1600° F.

6. A ceramic foam radiant gas burner, comprising a cylindrical gas combustion burner including a burner element made from a reticulated ceramic foam coated with a high emissivity composition to substantially decrease the likelihood of backflashing.

7. The radiant gas burner of claim 6, wherein said coating includes a graphite-containing composition.

8. The radiant gas burner of claim 6, wherein said coating includes an externally applied coating.

9. The radiant gas burner of claim 6, wherein said reticulated ceramic foam element has a porosity of from about 40 to about 100 pores per linear inch.

10. The radiant gas burner of claim 6, wherein said reticulated ceramic foam element has a porosity from about 40 to about 65 pores per linear inch.

11. The radiant gas burner of claim 6, wherein said reticulated ceramic foam has a porosity of about 45 pores per linear inch.

12. The radiant gas burner of claim 6, wherein said reticulated ceramic foam is made of a lithium, aluminum and silicon-containing composition.

13. The radiant gas burner of claim 6, wherein said reticulated ceramic foam has a percentage linear expansion less than 0.36% at about 1600° F.

14. The radiant gas burner of claim 6, wherein said reticulated ceramic foam has a density from about 0.36 to about 0.5 grams per cubic centimeter.

15. A ceramic foam radiant gas burner, comprising:
a cylindrical gas combustion burner including a burner element made from a reticulated ceramic foam being coated with a composition to substantially decrease the likelihood of backflashing;
a cylindrical baffle having a substantially round cross-section located within the reticulated ceramic foam burner element, said baffle having a gas receiving end and a terminal end, and said baffle having opening therein for distributing gas mixtures within the reticulated ceramic foam elements;
said openings in the baffle being disproportionately spaced over the entirety of the cylindrical baffle to unevenly distribute the gas to enhance uniform burning; and
said baffle being made of three integral and even portions, the first portion acting as the receiving end including at least twice as many openings as the other two portions, and said second and third portions acting respectively as a conduit and the terminal end, and each of the second and third portions having substantially equal number of openings therein.

16. A ceramic foam radiant gas burner, comprising:
a cylindrical gas combustion burner including a burner element made from a reticulated ceramic foam being coated with a composition to substantially decrease the likelihood of backflashing;
a cylindrical baffle having a substantially round cross-section located within the reticulated ceramic foam element for distributing combustion gas, said baffle having a gas receiving and a terminal end, and said baffle having openings therein for distributing gas within the reticulated ceramic foam elements; and
an ignition apparatus including at least two electrodes having a terminal end, said ignition apparatus being of a sufficient length to ignite gas as close to the terminal end as possible, yet short enough to minimize occurrences of undesired sparking from any point other than the terminal end.

17. The radiant gas burner of claim 16, further comprising:
an ionization detector having a detector portion located between the ignition apparatus and the reticulated ceramic foam to detect presence of a flame during combustion, said ionization detector being bent to extend the detector portion into the blue portion of the flame to receive the most reliable information because the blue portion of the flame contains the greatest concentration of ions; and
a feed back circuit in electrical communication with the ignition apparatus to re-spark the flame in the event that the ionization detector provides information that the combustion flame has extinguished.

18. A ceramic foam radiant gas burner, comprising:
a cylindrical gas combustion burner including a burner element made from a reticulated ceramic foam having a porosity of about 45 to about 65 pores per linear inch with a density of from about 0.36 to about 0.5 grams per cubic centimeter, wherein said reticulated ceramic foam is made of a lithium, aluminum and silicon-containing composition having a percentage linear expansion of less than about 0.36% at approximately 1600° Fahrenheit;
a high emissivity composition coating on the external surface of the reticulated ceramic foam burner element for substantially decreasing the likelihood of backflashing, said coating including a graphite-containing composition;
a cylindrical baffle having a substantially round cross-section located within the reticulated ceramic foam burner element, said baffle having a gas receiving end and a terminal end and said baffle having openings therein for unevenly distributing gas mixtures within the reticulated ceramic foam, said openings in the baffle being disproportionately spaced so that there are at least twice as many openings near the receiving end as there are near the terminal end to enhance uniform burning;
an ignition apparatus including at least two electrodes having terminal ends, said ignition apparatus being of sufficient length to ignite gas as close to the terminal end as possible, yet short enough to minimize occurrences of undesired sparking from any point other than the terminal end;
an ionization detector having a detector portion for detecting presence of a flame during combustion, said ionization detector being bent to extend the detector portion into the blue portion of the flame from combustion for receiving the most reliable information from the blue portion of the flame containing the highest concentration of ions; and
a feedback circuit in electrical communication with the ignition apparatus to re-spark the ignition apparatus for starting the flame in the event that the ionization detector provides information that the combustion flame has been extinguished.

* * * * *